（12）United States Patent
Konda et al.

(10) Patent No.: US 7,688,860 B2
(45) Date of Patent: Mar. 30, 2010

(54) DATA TRANSMISSION APPARATUS, DATA RECEPTION APPARATUS, DATA TRANSMISSION METHOD, AND DATA RECEPTION METHOD

(75) Inventors: Kazunobu Konda, Tokyo (JP); Hideki Ohkita, Kunitachi (JP); Hiroyuki Chaki, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 957 days.

(21) Appl. No.: 11/444,790

(22) Filed: May 31, 2006

(65) Prior Publication Data

US 2006/0271786 A1 Nov. 30, 2006

(30) Foreign Application Priority Data

May 31, 2005 (JP) .......................... P2005-160613

(51) Int. Cl.
H04J 3/24 (2006.01)
(52) U.S. Cl. .................. 370/474; 370/465; 713/171
(58) Field of Classification Search ................. 370/432, 370/462, 463, 321, 322, 324, 312, 474, 476, 370/465, 466; 713/168, 169, 170, 171
See application file for complete search history.

(56) References Cited

U.S. PATENT DOCUMENTS

| 6,502,192 | B1 * | 12/2002 | Nguyen | .......................... 726/4 |
| 6,668,324 | B1 | 12/2003 | Mangold et al. | |
| 6,826,699 | B1 | 11/2004 | Sun | |
| 7,218,643 | B1 * | 5/2007 | Saito et al. | ................... 370/466 |
| 7,266,694 | B2 | 9/2007 | Kokubo | |
| 7,529,935 | B2 | 5/2009 | Saito et al. | |
| 7,627,905 | B2 | 12/2009 | Morita et al. | |
| 2002/0025042 | A1 * | 2/2002 | Saito | .......................... 380/258 |
| 2003/0145214 | A1 | 7/2003 | Saito et al. | |

(Continued)

FOREIGN PATENT DOCUMENTS

JP 2000-187934 7/2000

(Continued)

OTHER PUBLICATIONS

Digital Transmission Content Protection Specification vol. 1 (Informal Version); Revision 1.3; p. 1-76; Jan. 7, 2004.

(Continued)

*Primary Examiner*—Chi H. Pham
*Assistant Examiner*—Kevin Mew
(74) *Attorney, Agent, or Firm*—Blakely, Sokoloff, Taylor & Zafman LLP

(57) ABSTRACT

A data transmission apparatus includes: a key exchange unit that exchanges an encryption key for encrypting and decrypting the data with an another apparatus; a first control unit that transmits information concerning the data transmission apparatus required in performing the key exchange by the another apparatus; a second control unit that transmits a first packet containing encrypted data and being set that the data size of the encrypted data is zero, to the another apparatus after the transmission of the information by the first control unit and until completion of the key exchange performed by the key exchange unit; and a third control unit that starts to transmit a second packet containing encrypted data provided by encrypting the data to be transmitted, to the another apparatus after completion of the key exchange performed by the key exchange unit.

15 Claims, 10 Drawing Sheets

U.S. PATENT DOCUMENTS

| | | | |
|---|---|---|---|
| 2003/0196028 A1* | 10/2003 | Maeda et al. | 711/103 |
| 2003/0226011 A1* | 12/2003 | Kuwano et al. | 713/155 |
| 2004/0107343 A1 | 6/2004 | Kokubo | |
| 2004/0158634 A1* | 8/2004 | Saito et al. | 709/225 |
| 2005/0027984 A1* | 2/2005 | Saito et al. | 713/168 |
| 2005/0068976 A1 | 3/2005 | Maeda et al. | |
| 2005/0081066 A1* | 4/2005 | Lahdensivu et al. | 713/202 |
| 2005/0160268 A1 | 7/2005 | Chaki et al. | |
| 2005/0210290 A1* | 9/2005 | Ono et al. | 713/201 |
| 2005/0257056 A1 | 11/2005 | Morita et al. | |
| 2006/0056629 A1 | 3/2006 | Adamson et al. | |
| 2006/0085644 A1* | 4/2006 | Isozaki et al. | 713/171 |
| 2006/0227807 A1* | 10/2006 | Jakubik et al. | 370/466 |
| 2006/0256815 A1* | 11/2006 | Kivinen et al. | 370/466 |
| 2006/0271785 A1* | 11/2006 | Holtmanns et al. | 713/171 |
| 2007/0110054 A1* | 5/2007 | Kozakai et al. | 370/389 |
| 2007/0130466 A1* | 6/2007 | Isozaki et al. | 713/171 |
| 2008/0148053 A1* | 6/2008 | Nakakita et al. | 713/171 |
| 2008/0168272 A1* | 7/2008 | Saito et al. | 713/171 |
| 2008/0209115 A1* | 8/2008 | Maeda et al. | 711/103 |
| 2008/0301445 A1* | 12/2008 | Vasic et al. | 713/171 |

FOREIGN PATENT DOCUMENTS

| | | |
|---|---|---|
| JP | 2001-177514 | 6/2001 |
| JP | 2001-326651 | 11/2001 |
| JP | 2002-140304 | 5/2002 |
| JP | 2003-085880 | 3/2003 |
| JP | 2003-101529 | 4/2003 |
| JP | 2003-218981 | 7/2003 |
| JP | 2003-224556 | 8/2003 |
| JP | 2003-323342 | 11/2003 |
| JP | 2004-104752 | 4/2004 |
| JP | 2004-128670 | 4/2004 |
| JP | 2004-194295 | 7/2004 |
| JP | 2005-045756 | 2/2005 |
| JP | 2005-110024 | 4/2005 |
| JP | 2005-167340 | 6/2005 |
| JP | 2005-301449 | 10/2005 |
| JP | 2006-506730 | 2/2006 |
| JP | 2006-339876 | 12/2006 |
| WO | 2004/046898 | 3/2004 |
| WO | 2005/057865 | 6/2005 |

OTHER PUBLICATIONS

DTCP vol. 1 Supplement E Mapping DTCP to IP (Informal Version); Revision 1.0; p. 1-19; Nov. 24, 2003.

Content Directory:1 Service Template Version 1.01 For Universal Plug and Play Version 1.0 Status: Standardized DCP; Dated Jun. 25, 2002; p. 1-89; Microsoft Corporation.

Fielding, R. et al.; Nypertext Transfer Protocol—HTTP/1.1; Standards Track; p. 1-176; Jun. 1999.

Kunitake Kaneko, "End-toEnd type Mobility Support in Internet Environment that becomes diversified", The Special Interest Group Notes of Information Processing Society of Japan, Information Processing Society of Japan, Published on May 24, 2002, vol. 2002 No. 49, p. 45 to 50.

"Part 2 Broaden Loop of Secure on the premise of Network", Nikkei Electronics, Published by Nikkei BP, Inc., Published on May 10, 2004, No. 873, p. 88 to 95.

Japanese Patent Application No. 2005-160613, Notification of Reasons for Refusal, sent Nov. 10, 2009 (English translation).

* cited by examiner

FIG. 1
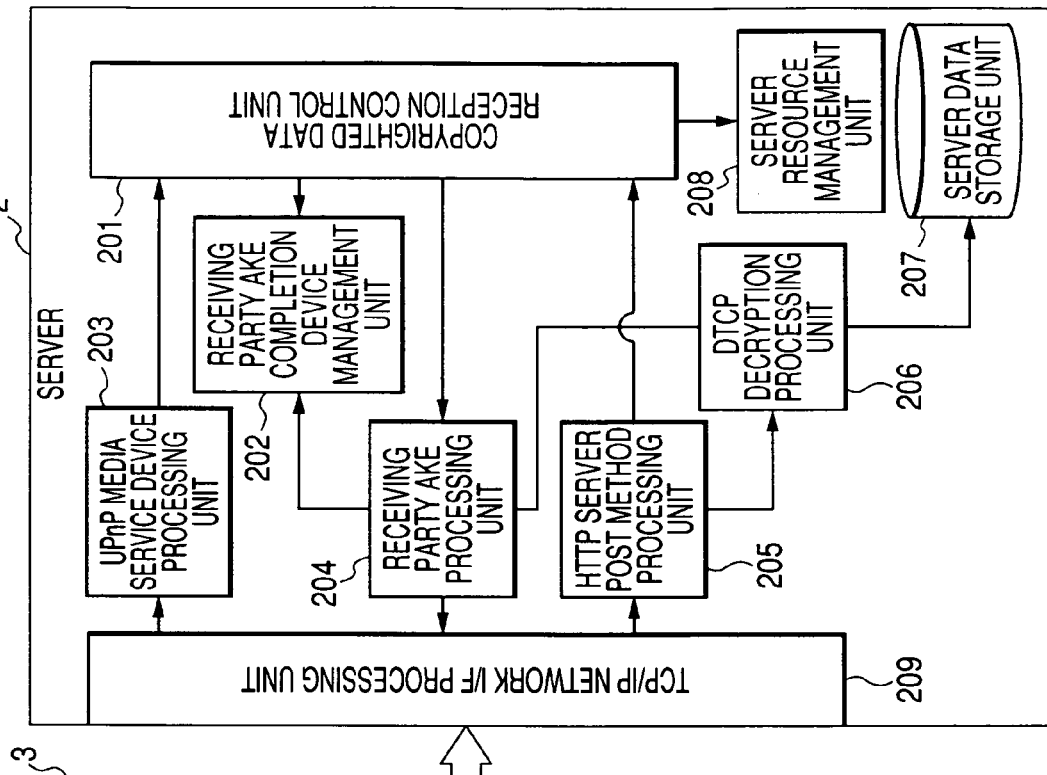
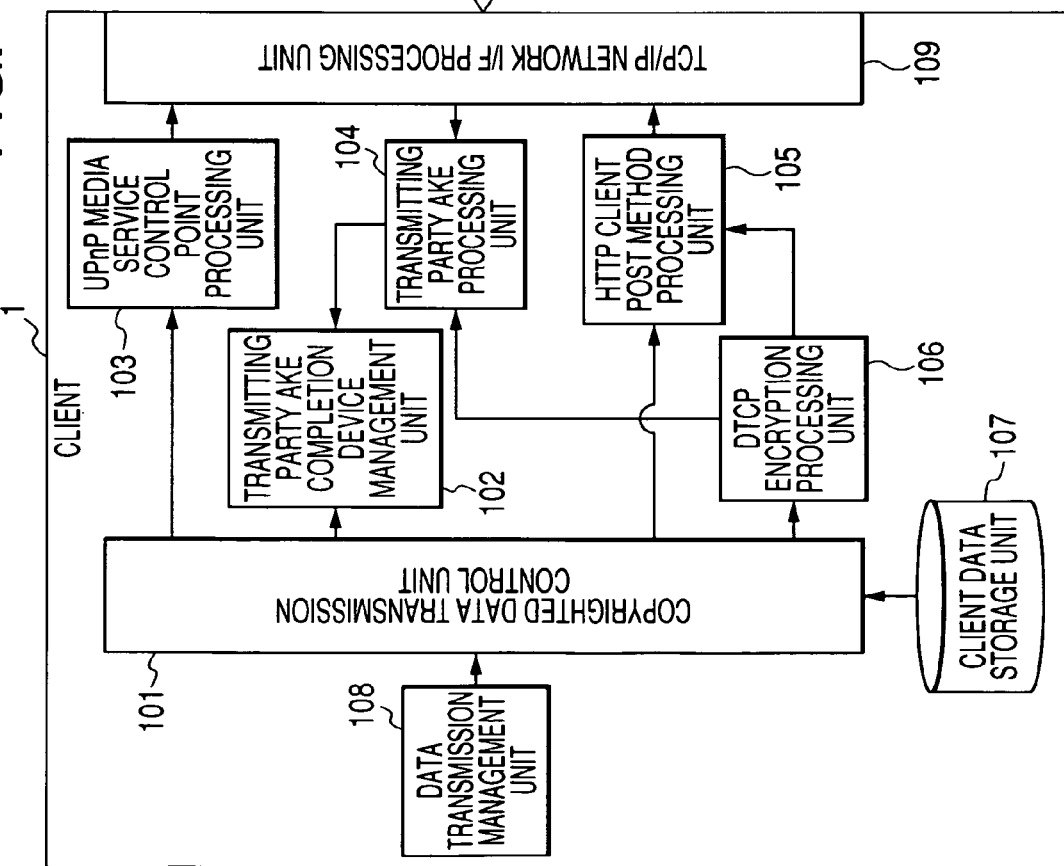

FIG. 3

```
<res protocolInfo="*:*:video/mpeg:XXXXXXX.CO.JP_CPPORT=23455;
XXXXXXX.CO.JP_CPHOST=192.168.0.10"></res>
```

FIG. 4

```
Content-Type:application/X-dtcp!;DTCP1HOST=192.168.0.10;
DTCP1PORT=23455;CONTENTFORMST=video/mpeg
```

FIG. 5

| | msb | | | | | | | | | | | | lsb |
|---|---|---|---|---|---|---|---|---|---|---|---|---|---|
| Header[0] | reserved(zero) | | | | | | | | | | | | |
| Header[1] | | | | | | C_A | | exchange_key_label | | | E_EMI | | |
| Header[2]–Header[9] | Nc(64bit) | | | | | | | | | | | | |
| Header[10]–Header[13] | Byte_length of content CL(32bit)=0 | | | | | | | | | | | | |

FIG. 11

<res protocolInfo="*:*:video/mpeg:XXXXXXX.CO.JP_CPPORT=23455; XXXXXXX.CO.JP_CPHOST=192.168.0.10;XXXXXXX.CO.JP_CPID=3821"></res>

FIG. 12

CPSrcID.xxxxxxx.co.jp=3821

FIG. 13

CPSinkID.xxxxxxx.co.jp=3821

DATA TRANSMISSION APPARATUS, DATA RECEPTION APPARATUS, DATA TRANSMISSION METHOD, AND DATA RECEPTION METHOD

CROSS-REFERENCE TO RELATED APPLICATIONS

This application is based upon and claims the benefit of priority from Japanese Patent Application No. 2005-160613, filed on May 31, 2005, the entire data of which are incorporated herein by reference.

BACKGROUND

1. Field

One embodiment relates to data transmission and reception techniques suitable to be applied for reliably moving recorded data of a copy-once program between two recorders.

2. Description of the Related Art

In using "UPnP AV" as a control protocol and HTTP as a data transmission protocol in an environment using IP (Internet Protocol) as a network infrastructure, DTCP-IP as a copyright protection mechanism (DRM system; Digital Rights Management system) is used. (For example, refer to JP-A-2004-104752.)

To transmit data to a UPnP device, the transmitting party reserves the resources on the UPnP device before transmitting the data and then starts to transmit encrypted data provided by encrypting the data. To decrypt the data at the receiving party, machine authentication and key exchange (AKE) between the transmitting party and the receiving party are conducted before the data is sent.

Further, to move the data protected by DTCP-IP, simultaneous existence of the data at both the move source and the move sink is inhibited and therefore the move source must send the data while erasing the portion sent to the move sink or making the portion unreadable. (For example, refer to JP-A-2003-101529.)

Therefore, to move the data protected by DTCP-IP for inhibiting simultaneous existence of the data at both the move source and the move sink, if the data cannot be recorded reliably at the receiving party, the data is erased.

The AKE start timing is not defined in DTLA. Therefore, a server accepting data transfer from a client starts AKE at what timing is implementation dependent. This means that implementation for executing AKE after determining whether or not the data is encrypted may be adopted.

In such implementation, whether or not the data is encrypted is determined based on E-EMI of a PCP (Protected Content Packet) header in an HTTP body. Thus, to execute AKE between the client and the server of the implementation, the client must transmit an HTTP body.

However, to move the data, if the encrypted data is stored in the HTTP body and is transmitted before AKE completion, the data cannot be decrypted during the AKE processing and a part of the data (already erased at the transmitting (move) source) is lost.

In order to cope with such a situation, the following method is possible: When a request to reserve resources is sent to a UPnP device at the receiving party, the receiving party receiving the request starts AKE and then the data is transmitted according to HTTP POST. In this method, however, if the data is transmitted just after the resources are reserved, AKE is not executed and thus data not decrypted occurs and a part of the data after move cannot be played back. In the method, if AKE results in failure, the transmitting party needs to delete the reserved resources of the UPnP device at the receiving party and on the other hand, fruitless resources are temporarily left at the receiving party.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary schematic block diagram of a data transmission-reception system according to an embodiment;

FIG. 3 is an exemplary drawing to show an example of AKE information in CDS:CreateObject action in the data transmission-reception system of the embodiment;

FIG. 4 is an exemplary drawing to show an example of AKE information in an HTTP POST request in the data transmission-reception system of the embodiment;

FIG. 5 is an exemplary drawing to show the format of PCP used with the data transmission-reception system of the embodiment;

FIG. 11 is an exemplary drawing to show a modified example of the AKE information in CDS:CreateObject action in the data transmission-reception system of the embodiment;

FIG. 12 is an exemplary drawing to show a modified example of the AKE information in an HTTP POST request in the data transmission-reception system of the embodiment; and FIG. 13 is an exemplary drawing to show a modified example of the AKE information in an HTTP POST response in the data transmission-reception system of the embodiment.

DETAILED DESCRIPTION

Figure 2:
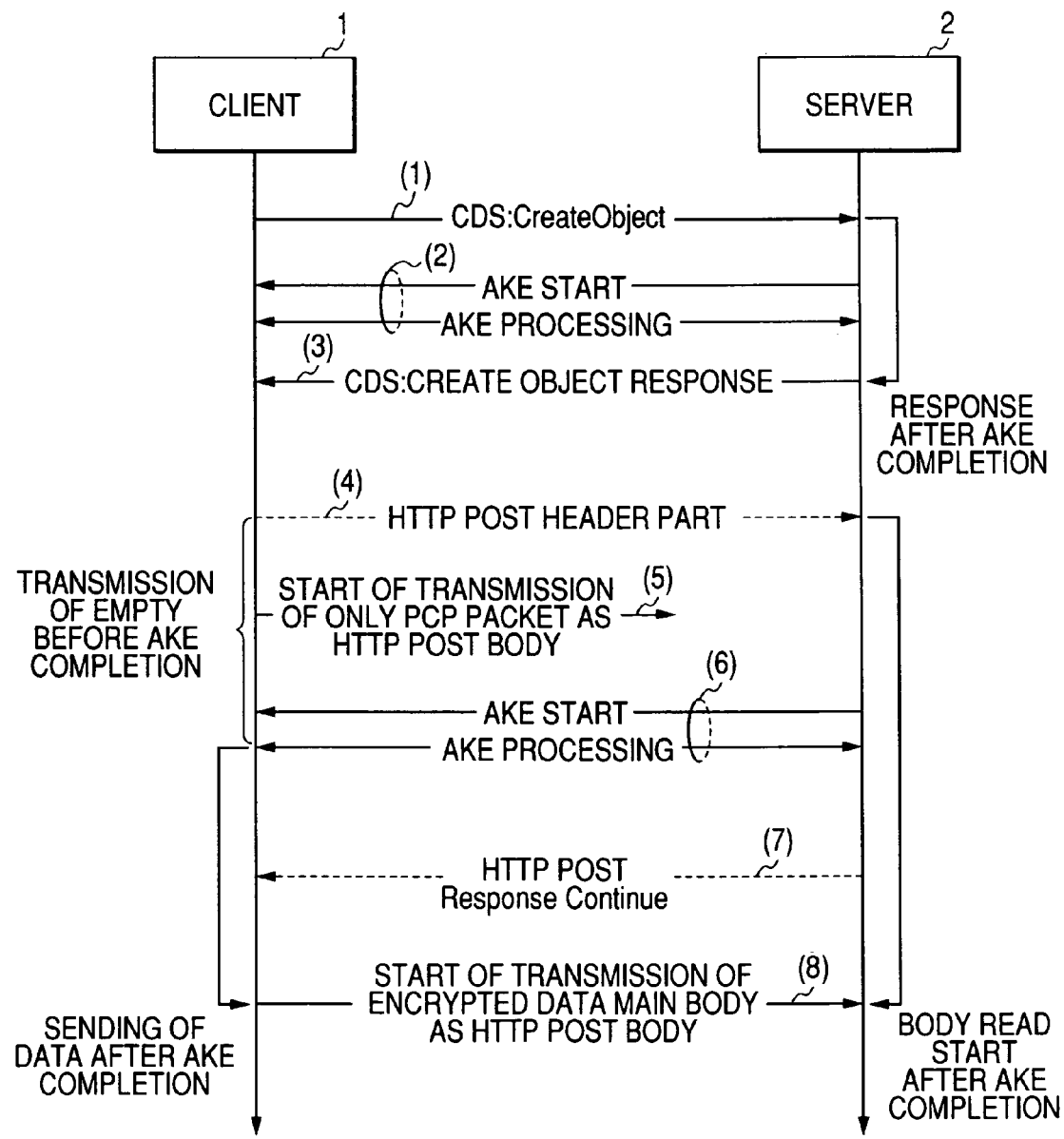
FIG. 2 is an exemplary schematic sequence chart between a client and a server of the data transmission-reception system of the embodiment.

An embodiment will be described below with reference to the accompanying drawings.

FIG. 1 is an exemplary schematic block diagram of a data transmission-reception system according to an embodiment. In the data transmission-reception system, a client 1 and a server 2 are connected through a network 3.

The client 1 includes a copyrighted data transmission control unit 101, a transmitting party AKE completion device management unit 102, a UPnP media service control point processing unit 103, a transmitting party AKE processing unit 104, an HTTP client POST method processing unit 105, a DTCP encryption processing unit 106, a client data storage unit 107, a data transmission management unit 108, and a TCP/IP network I/F processing unit 109.

The copyrighted data transmission control unit 101 performs system control to move copyrighted data to the server 2. The transmitting party AKE completion device management unit 102 stores information concerning the machine executing key exchange (AKE). The UPnP media service control point processing unit 103 performs a control command for a UPnP media service device processing unit 203 (described later) of the server 2.

The transmitting party AKE processing unit 104 performs transmitting party AKE processing. The HTTP client POST method processing unit 105 performs processing relevant to a client of an HTTP POST method and transmits data to the server 2. The DTCP encryption processing unit 106 encrypts copyrighted data according to an encryption technique defined in DTCP.

The client data storage unit 107 records and stores copyrighted data. The data transmission management unit 108 accepts a command from the user and starts data move processing. The TCP/IP network I/F processing unit 109 receives a TCP/IP processing request from the UPnP media service control point processing unit 103, the transmitting party AKE processing unit 104, and the HTTP client POST method processing unit 105, and conducts communications with the server 2.

The server 2 includes a copyrighted data reception control unit 201, a receiving party AKE completion device management unit 202, the above-mentioned UPnP media service device processing unit 203, a receiving party AKE processing unit 204, an HTTP server POST method processing unit 205, a DTCP decryption processing unit 206, a server data storage unit 207, a server resource management unit 208, and a TCP/IP network I/F processing unit 209.

The copyrighted data reception control unit 201 performs system control to receive move of copyrighted data from the client 1. The receiving party AKE completion device management unit 202 stores information concerning the machine executing AKE. The UPnP media service device processing unit 203 operates based on a control command from the UPnP media service control point processing unit 103 of the client 1.

The receiving party AKE processing unit 204 performs receiving party AKE processing. The HTTP server POST method processing unit 205 performs processing relevant to a server of the HTTP POST method and receives data from the client 1. The DTCP decryption processing unit 206 decrypts encrypted copyrighted data according to a decryption technique defined in DTCP.

The server data storage unit 207 records and stores copyrighted data. The server resource management unit 208 manages the resources of the server 2 to record copyrighted data transmitted from the client 1. The TCP/IP network I/F processing unit 209 receives a TCP/IP processing request from the UPnP media service device processing unit 203, the receiving party AKE processing unit 204, and the HTTP server POST method processing unit 205, and conducts communications with the client 1.

Next, a transmission-reception sequence of copyrighted data between the client 1 and the server 2 in the data transmission-reception system of the embodiment having the configuration will be discussed with reference to FIG. 2.

To move copyrighted data to the server 2, first the client 1 reserves the resources of the server 2 by "CDS:CreateObject" action of Content Directory Service defined in UPnP AV (refer to (1) shown in FIG. 2). The resources reserved by the "CDS:CreateObject" action include processing power and storage (memory) area of the server 2. To reserve the resources of the server 2, the client 1 adds the port number of the client and the host address for executing AKE as properties. The values are defined in the fourth field of res@ProtocolInfo, for example, as shown in FIG. 3. In the example in FIG. 3, MIME-TYPE is video/mpeg, the port number is 23455, and the host address is 192.168.0.10.

Upon reception of the "CDS:CreateObject" action request, first the server 2 checks the IP address to see if AKE with the client 1 is already conducted. If AKE is not conducted, the server 2 starts AKE processing (refer to (2) shown in FIG. 2). After completion of the AKE processing, the server 2 reserves the resources as requested and sends a response of a result notification (refer to (3) shown in FIG. 2). That is, the resources are reserved after completion of the AKE processing, whereby a situation in which AKE processing results in failure although the resources are reserved is prevented from occurring.

Next, the client 1 transmits only header data to the URL contained in the response data to the "CDS:CreateObject" action using the HTTP POST method for data transmission (refer to (4) shown in FIG. 2). The header data has a Data-Type entity header shown in FIG. 4, and the port number and the host address used in the AKE of the client 1 are described. An Expect mechanism defined in HTTP1.1 is used and an "Expect:100-Continue" header is added.

The client 1 transmits an HTTP body not containing the data main body with CL (content length) of PCP (Protected Content Packet) shown in FIG. 5 to "0" as HTTP POST body until completion of the AKE with the server 2 (refer to (5) shown in FIG. 2). In the PCP as shown in FIG. 5, E-EMI is an indicator that indicates whether or not the content of the PCP is encrypted. In the PCP which the client 1 transmits in (5) shown in FIG. 2, E-EMI is indicates the content of the PCP is encrypted. On the other hand, the server 2 reads only the header part of the HTTP POST method received in (4) shown in FIG. 2 and checks the IP address to see if AKE with the client 1 is already conducted. If AKE is not conducted (for example, the IP address of the client 1 is changed after the "CDS:CreateObject" action request, etc.,), the server 2 conducts AKE using the port number and the host address of the client 1 acquired from the request in the format shown in FIG. 4 (refer to (6) shown in FIG. 2). Upon completion of the AKE, the server 2 sends an HTTP POST response in "100 Continue" (refer to (7) shown in FIG. 2).

Upon reception of the HTTP POST method response, the client 1 transmits the PCP storing the encrypted data to the server 2 as the HTTP body (refer to (8) shown in FIG. 2).

That is, the HTTP body not containing the data main body with CL of PCP to "0" is transmitted and is received until completion of the AKE and after completion of the AKE, transmission and reception of the HTTP body containing the PCP storing the encrypted data are started, whereby a situation in which the encrypted data cannot be decrypted and a part of the data is lost can be prevented reliably.

Figure 6:
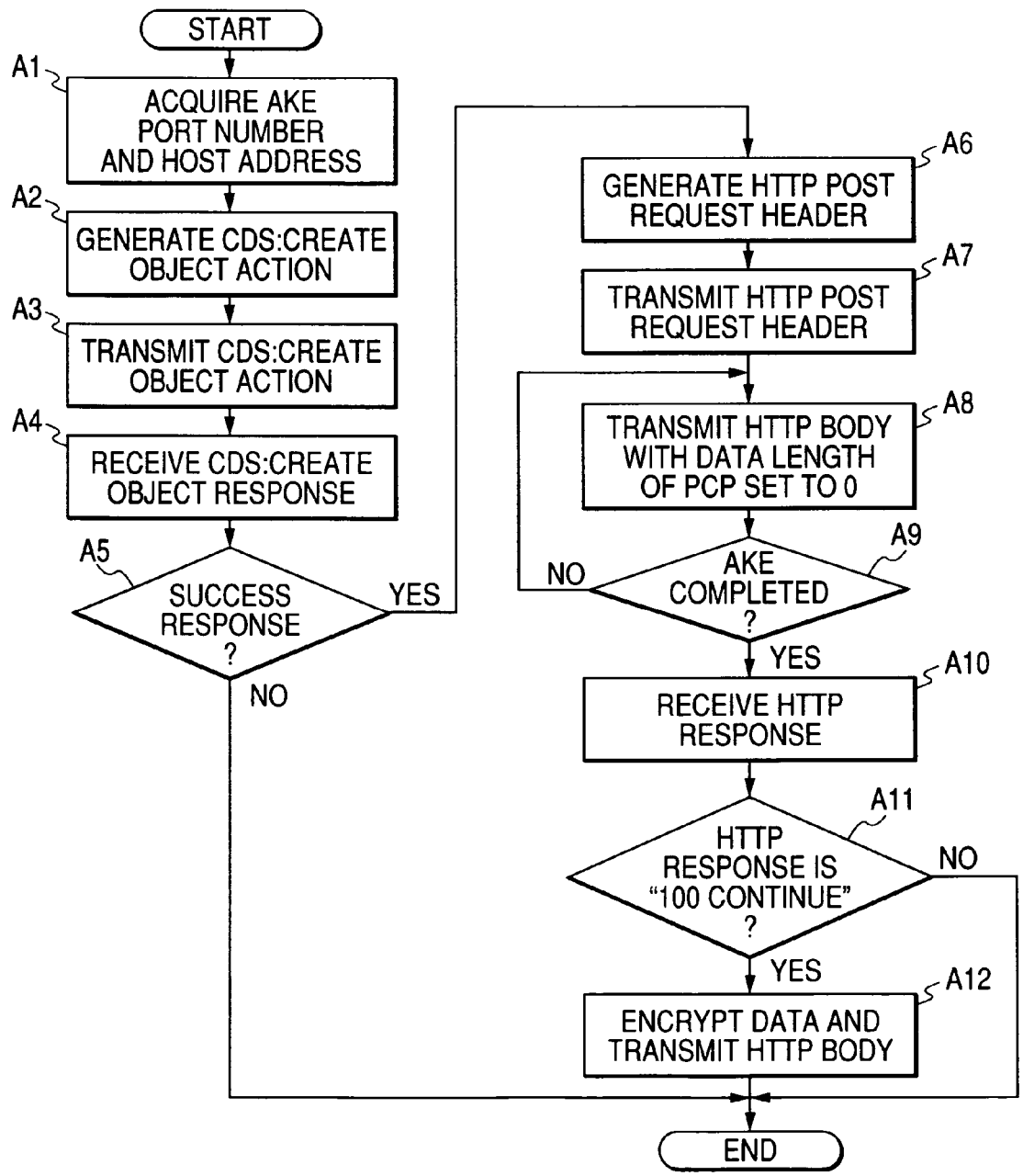
FIG. 6 is an exemplary flowchart to show the operation procedure of the client of the data transmission-reception system of the embodiment.

FIG. 6 is a flowchart to show the operation procedure of the client 1.

The client 1 first acquires the AKE port number and the host address (step A1) and generates a "CDS:CreateObject" action using the acquired information (step A2). The client 1 transmits the generated "CDS:CreateObject" action to the server 2 (step A3) and receives a "CDS:CreateObject" response that is in response to the "CDS:CreateObject" action from the server 2 (step A4).

The client 1 checks whether or not whether or not the "CDS:CreateObject" response is a success response (step A5) and if the "CDS:CreateObject" response is a success response (YES at step A5), the client 1 generates an HTTP POST request header (step A6) and transmits the generated HTTP POST request header to the server 2 (step A7). After transmitting the HTTP POST request header, then the client 1 transmits an HTTP body with the content length of PCP set to "0" to the server 2 (step A8).

The client 1 transmits the HTTP body with the content length of PCP set to "0" until completion of AKE. Upon completion of the AKE, the client 1 receives an HTTP response (step A10). The client 1 checks whether or not the HTTP response is "100 Continue" (step A11) and if the HTTP response is "100 Continue" (YES at step A11), the client 1 encrypts the data and transmits the HTTP body to the server 2 (step A12).

Figure 7:
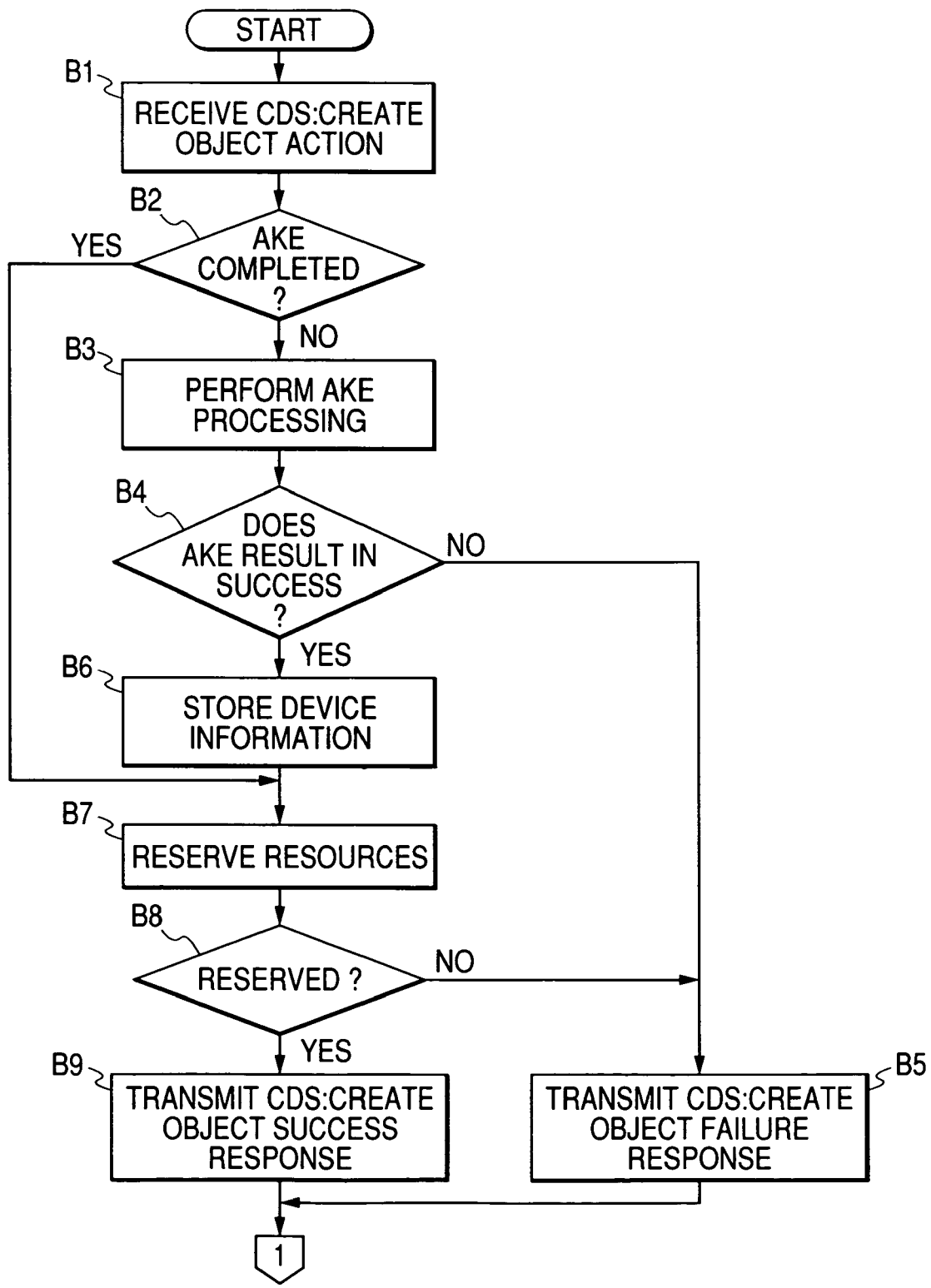
FIG. 7 is an exemplary first flowchart to show the operation procedure of the server of the data transmission-reception system of the embodiment.
Figure 8:
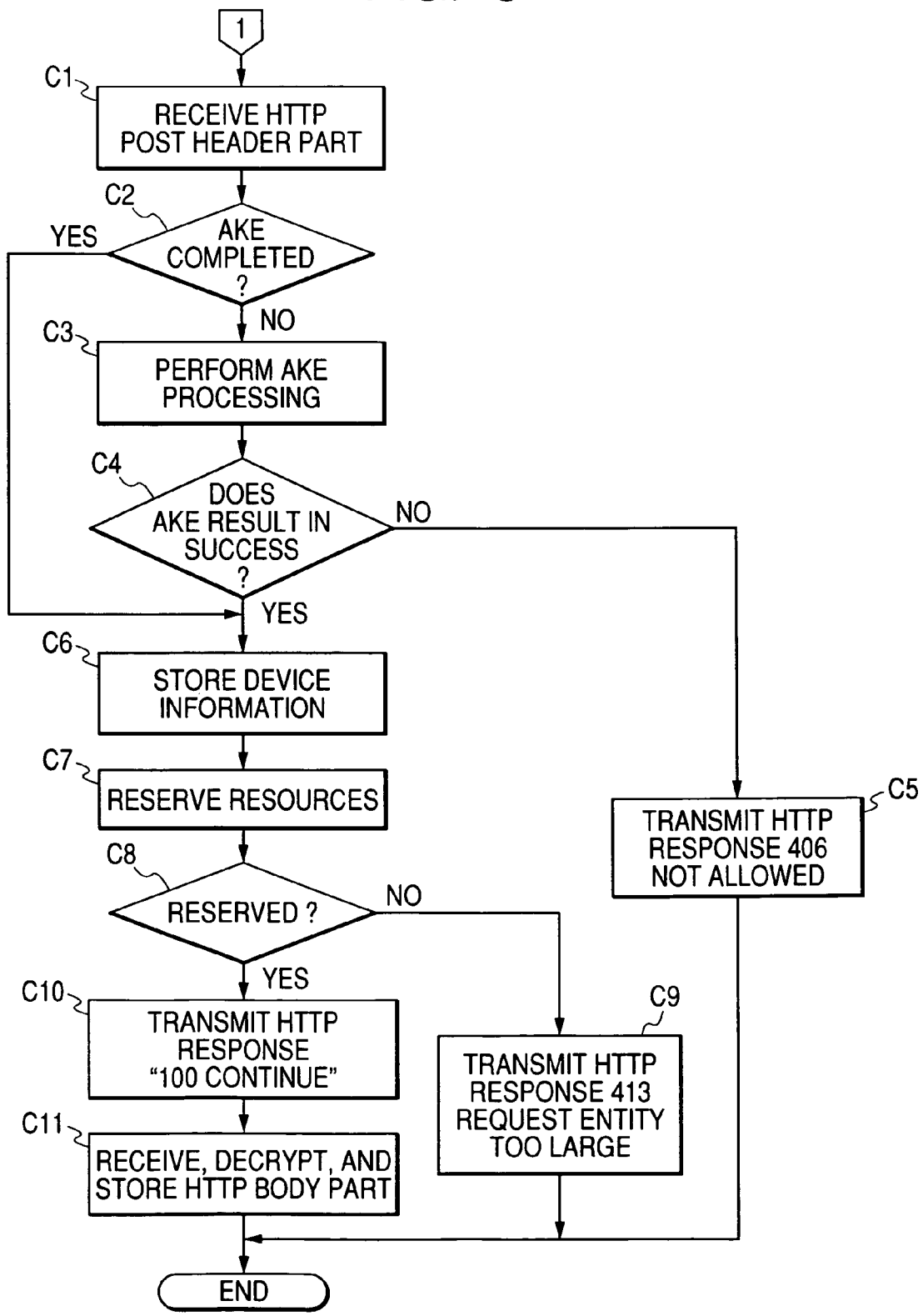
FIG. 8 is an exemplary second flowchart to show the operation procedure of the server of the data transmission-reception system of the embodiment.

FIGS. 7 and 8 are flowcharts to show the operation procedure of the server 2.

Upon reception of a "CDS:CreateObject" action (step B1 in FIG. 7), the server 2 checks the IP address to see if AKE is complete (step B2 in FIG. 7) and if AKE is not complete (NO at step B2 in FIG. 7), the server 2 performs AKE (step B3 in FIG. 7). If the AKE results in failure (NO at step B4 in FIG. 7), the server 2 transmits a failure response to the "CDS:CreateObject" action (step B5 in FIG. 7).

If the AKE results in success (YES at step B4 in FIG. 7), the server 2 stores the device information (step B6 in FIG. 7) and reserves the resources (step B7 in FIG. 7). Here, to reserve the resources, the real area to store the data main body transmitted from the client 1 is not reserved and an entry to assign any area to the area to store the data main body is reserved.

If reserving the resources results in failure (NO at step B8 in FIG. 7), the server 2 transmits a failure response to the "CDS:CreateObject" action (step B5 in FIG. 7) as the AKE results in failure; if the resources can be reserved (YES at step B8 in FIG. 7), the server 2 transmits a success response to the "CDS:CreateObject" action (step B9 in FIG. 7).

After transmitting the success response, the server 2 receives an HTTP POST header part (step C1 in FIG. 8) and checks the IP address to see if the AKE is complete at the timing (step C2 in FIG. 8). If the AKE is not complete (NO at step C2 in FIG. 8), the server 2 performs AKE (step C3 in FIG. 8). If the AKE results in failure (NO at step C4 in FIG. 8), the server 2 transmits "406 Not Allowed" as an HTTP response (step C5 in FIG. 8).

On the other hand, if the AKE results in success (YES at step C4 in FIG. 8), the server 2 stores the device information (step C6 in FIG. 8) and reserves the resources (step C7 in FIG. 8). The reservation of the resources in step C7 is performed by reserving the real memory area for storing the data main body transmitted from the client 1 and by associating the reserved memory area with the previously reserved entry.

If reserving the resources results in failure (NO at step C8 in FIG. 8), the server 2 transmits "413 Request Entity Too Large" as an HTTP response (step C9 in FIG. 8); if the resources can be reserved (YES at step C8 in FIG. 8), the server 2 transmits "100 Continue" as an HTTP response (step C10 in FIG. 8) and receives, decrypts, and stores the HTTP body part (step C11 in FIG. 8).

Figure 9:
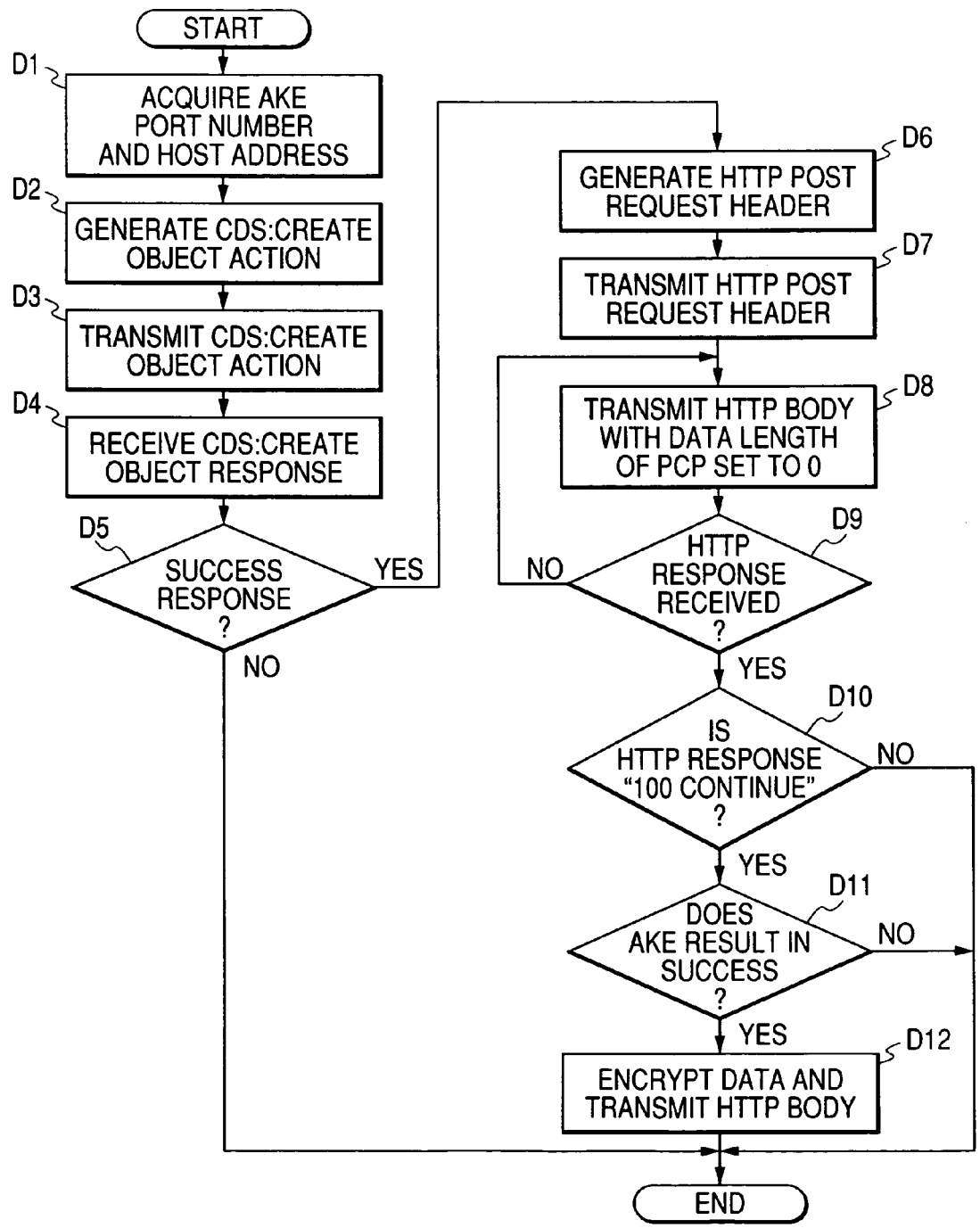
FIG. 9 is an exemplary flowchart to show a modified example of the operation procedure of the client of the data transmission-reception system of the embodiment.
Figure 10:
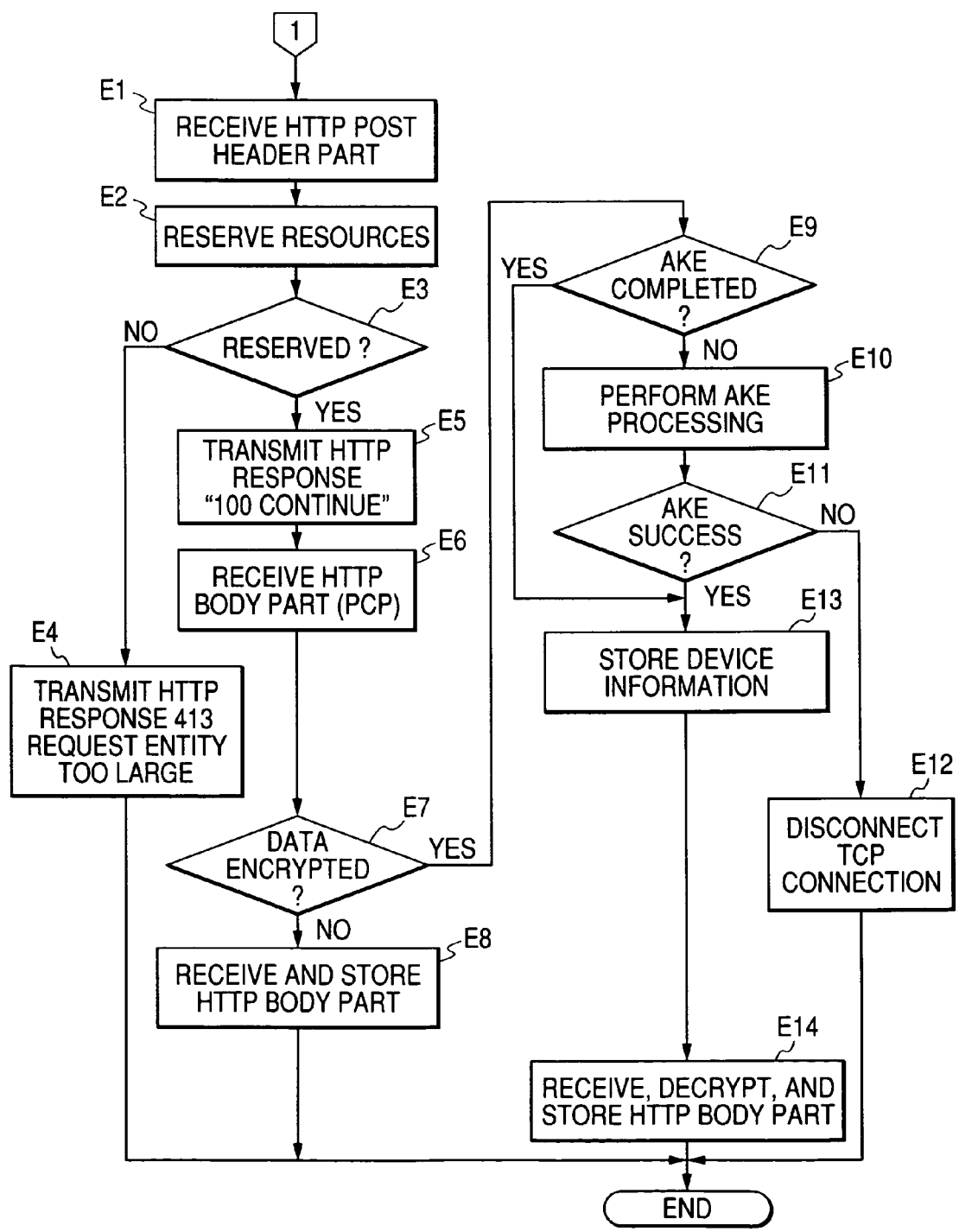
FIG. 10 is an exemplary flowchart to show a modified example of the second flowchart of the operation procedure of the server of the data transmission-reception system of the embodiment.

In the flowcharts of FIGS. 6 to 8, after the "CDS:CreateObject" action, the AKE processing and the resource reserving processing are performed in this order, but the invention is not limited to the order and the AKE processing and the resource reserving processing may be performed in the opposite order. FIGS. 9 and 10 are flowcharts corresponding to those of FIGS. 6 and 8 to perform the AKE processing and the resource reserving processing in the opposite order.

In this case, after transmitting the HTTP body with the content length of PCP to "0" to the server 2 (step D8 in FIG. 9), the client 1 first checks whether or not an HTTP response is received (step D9 in FIG. 9) and transmits the HTTP body until reception of an HTTP response. Upon reception of an HTTP response (YES at step D9 in FIG. 9), the client 1 checks whether or not the HTTP response is "100 Continue" (step D10 in FIG. 9) and if the HTTP response is "100 Continue" (YES at step D10 in FIG. 9), the client 1 checks whether or not AKE results in success (D11 in FIG. 9). If AKE results in success (YES at D11 in FIG. 9), the client 1 encrypts the data and transmits the HTTP body to the server 2 (step D12 in FIG. 9).

On the other hand, upon reception of the HTTP POST header part (step E1 in FIG. 10), first the server 2 reserves the resources of the real area (step E2 in FIG. 10) and if the resources cannot be reserved (NO at step E3 in FIG. 10), the server 2 transmits "413 Request Entity Too Large" as an HTTP response (step E4 in FIG. 10). If the resources can be reserved (YES at step E3 in FIG. 10), the server 2 transmits "100 Continue" as an HTTP response (step E5 in FIG. 10) and receives the HTTP body (step E6 in FIG. 10). The server 2 checks whether or not the data is encrypted (step E7 in FIG. 10) and if the data is not encrypted (NO at step E7 in FIG. 10), the server 2 receives and stores the HTTP body part (step E8 in FIG. 10).

If the data is encrypted (YES at step E7 in FIG. 10), the server 2 checks whether or not AKE is complete (step E9 in FIG. 10). If AKE is not complete (NO at step E9 in FIG. 10), the server 2 performs AKE (step E10 in FIG. 10). If the AKE results in failure (NO at step E11 in FIG. 10), the server 2 disconnects the TCP connection (step E12 in FIG. 10). If the AKE results in success (YES at step E11 in FIG. 10), the server 2 stores the device information (step E13 in FIG. 10) and receives, decrypts, and stores the HTTP body (step E14 in FIG. 10).

The order of the AKE processing and the resource reserving processing after the "CDS:CreateObject" action can be thus changed.

To reserve the resources of the server at the timing in (1) shown in FIG. 2, the device ID can also be added as the properties in addition to the port number of the client and the host address described above as the information for executing AKE. FIG. 11 shows an example wherein MIME-TYPE is video/mpeg, the port number is 23455, the host address is 192.168.0.10, and the Device ID is 3821. In this case, when receiving a "CDS:CreateObject" action request, the server 2 checks the device ID to see if AKE with the client 1 is conducted.

In this case, when transmitting the HTTP POST header at the timing in (5) shown in FIG. 2, the client 1 adds a header representing the device defined in DTCP as the machine-unique value, for example, as shown in FIG. 12. On the other hand, when sending a response at the timing in (7) shown in FIG. 2, the server 2 adds the machine-unique value to "100 Continue" in the format as shown in FIG. 13.

Accordingly, even if the IP address of the client 1 is changed after the "CDS:CreateObject" action request, completion of AKE can be recognized based on the device ID and execution of unnecessary AKE can be skipped.

As described above in detail, in the data transmission-reception system of the embodiment, the resources of the server 2 are reserved only if AKE is complete, and data is transmitted and received only if the encrypted data can be decrypted. Thus, fruitless resource reserving in the server 2 is eliminated and the need for erasing fruitless resources in the client 1 is eliminated and the encrypted data is not transmitted before AKE is complete, so that loss of data is prevented reliably.

The server 2 also performs AKE from header information of media transmission and checks that transmission can be executed just before data is transmitted and therefore can also acquire data reliably from the client 1 whose IP address is changed just before the data is transmitted.

Further, after sending the header part, the client 1 sends the HTTP body containing only the PCP header until AKE is complete and therefore can also wait until the AKE is complete for a server of such implementation for starting AKE only if the HTTP body is received rather than implementation like the server 2 of the embodiment.

It is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

As described with reference to the embodiment, there is provided a data transmission apparatus, a data reception apparatus, a data transmission method, and a data reception method that reliably move data protected by a copyright protection mechanism for inhibiting simultaneous existence of data at both a move source and a move sink.

Accordingly, it becomes possible to reliably move data protected by the copyright protection mechanism for inhibiting simultaneous existence of data at both the move source and the move sink.

In the embodiment, the client 1 exchanges an encryption key with the server 2 when performing the key exchange (AKE), the encryption key being used for encrypting and decrypting the data to be transmitted. The encryption key may be a common key used in both encrypting and decrypting the data, or may be a public key for decrypting the data and pairs with a private key for encrypting the data. That is, the key exchange (AKE) performed between the client 1 and the server 2 may be performed by a common key cryptosystem or by a public key cryptosystem.

In the data transmission-reception system described in the embodiment, the client 1 exchanges the encryption key with the sever 2 and transmits data protected by a copyright protection mechanism to the same server 2. However, the data transmission-reception system may be configured that the client 1 transmits the data protected by a copyright protection mechanism to a first apparatus, while performing AKE (key exchange) with a second apparatus different from the first apparatus.

It is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

While certain embodiment have been described, the embodiment have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data transmission apparatus for transmitting data protected by a copyright protection mechanism for inhibiting simultaneous existence of data at both of a source and a sink of the movement, to a first apparatus via a computer network, the data transmission apparatus comprising:
   a key exchange unit that exchanges an encryption key with a second apparatus, the encryption key being used for encrypting and decrypting the data;
   a first control unit that transmits information for performing the key exchange by the second apparatus;
   a second control unit that transmits a first packet having a header section configured to indicate that data contained in a data section of the first packet is encrypted and that a size of the data section is zero, to the first apparatus after the transmission of the information by the first control unit; and
   a third control unit that staffs to transmit a second packet having a header section and a data section containing encrypted data provided by encrypting the data to be transmitted, to the first apparatus after completion of the key exchange performed by the key exchange unit.

2. The data transmission apparatus according to claim 1, wherein the first apparatus is identical with the second apparatus.

3. The data transmission apparatus according to claim 1, wherein the second control unit transmits the first packet to the first apparatus after the transmission of the information by the first control unit and until completion of the key exchange performed by the key exchange unit.

4. The data transmission apparatus according to claim 1, wherein an Internet Protocol is used as a network infrastructure and a HyperText Transfer Protocol is used as a transmission protocol, and
   wherein the first control unit transmits an HTTP header containing a port number and a host address of the data transmission apparatus, to the second apparatus, as the information for performing the key exchange.

5. The data transmission apparatus according to claim 4, wherein the first control unit transmits the HTTP header further containing a device ID of the data transmission apparatus, to the second apparatus.

6. The data transmission apparatus according to claim 1, wherein a HyperText Transfer Protocol is used as a transmission protocol, and
   wherein the second control unit transmits an HTTP body containing only PCP (protect data packet) being set that the data size of the PCP is zero, to the first apparatus.

7. A data reception apparatus for receiving data protected by a copyright protection mechanism for inhibiting simultaneous existence of data at both a source and a sink of the movement from a first apparatus via a computer network, the data reception apparatus comprising:
   a key exchange unit that exchanges an encryption key used to encrypt and decrypt the data with a second apparatus;
   a first control unit that (i) controls the key exchange unit to start the key exchange when a request to reserve memory area for storing the data is received from the first apparatus and (ii) determines whether or not it is necessary to perform the key exchange with the second apparatus; and
   a second control unit that (i) reserves the memory area as requested after completion of the key exchange performed by the key exchange unit, (ii) transmits a notification of the completion of the reservation of the memory area to the second apparatus and (iii) reserves resources as requested immediately when the first control unit determines that the key exchange is not necessary to be performed.

8. The data reception apparatus according to claim 7, wherein the first apparatus is identical with the second apparatus.

9. The data reception apparatus according to claim 7, wherein Internet Protocol is used as a network infrastructure, and
wherein the first control unit determines whether or not it is necessary to perform the key exchange with the second apparatus based on an IP address of the another apparatus.

10. The data reception apparatus according to claim 7, wherein the first control unit determines whether or not it is necessary to perform the key exchange with the second apparatus based on a device ID of the another apparatus.

11. A data reception apparatus for receiving data protected by a copyright protection mechanism for inhibiting simultaneous existence of data at both a source and a sink of the movement from a first apparatus via a computer network, the data reception apparatus comprising:
a key exchange unit that exchanges an encryption key with a second apparatus, the encryption key being used for encrypting and decrypting the data;
a first control unit that reads only an area where information for the key exchange performed by the key exchange unit is stored when reception of encrypted data provided by encrypting the data is started;
a second control unit that controls the key exchange unit to start the key exchange using the information concerning the second apparatus stored in the area read by the first control unit; and
a third control unit that starts reading an area where the encrypted data provided by encrypting the data is stored, after completion of the key exchange performed by the key exchange unit.

12. The data reception apparatus according to claim 11, wherein HyperText Transfer Protocol is used as a transmission protocol of the data,
wherein the first control unit reads only an HTTP header as the area where the information concerning the first apparatus is stored, and
wherein the third control unit reads PCP (protect data packet) contained in an HTTP body in order as the area where the encrypted data provided by encrypting the data is stored.

13. The data reception apparatus according to claim 11, wherein the second control unit determines whether or not it is necessary to perform the key exchange with the first apparatus, and
wherein the third control unit starts to read the PCP contained in the HTTP body immediately when the second control unit determines that the key exchange is not necessary to be performed.

14. The data reception apparatus according to claim 13, wherein an Internet Protocol is used as a network infrastructure, and
wherein the second control unit determines whether or not it is necessary to execute key exchange with the second apparatus based on an IP address of the second apparatus.

15. The data reception apparatus according to claim 13, wherein the second control unit determines whether or not it is necessary to perform the key exchange with the second apparatus based on a device ID of the second apparatus.

* * * * *